US005968159A

United States Patent [19]

Mattheis

[11] Patent Number: 5,968,159

[45] Date of Patent: Oct. 19, 1999

[54] INTERRUPT SYSTEM WITH FAST RESPONSE TIME

[75] Inventor: Karl-Heinz Mattheis, San Jose, Calif.

[73] Assignee: Infineon Technologies Corporation, San Jose, Calif.

[21] Appl. No.: 08/927,993

[22] Filed: Sep. 12, 1997

[51] Int. Cl.[6] .......... G06F 13/26

[52] U.S. Cl. .......... 710/264; 710/260; 710/40

[58] Field of Search .......... 395/733, 737, 395/860, 864, 868; 710/260, 264, 40, 44, 48

[56] References Cited

U.S. PATENT DOCUMENTS

| | | | |
|---|---|---|---|
| 4,768,149 | 8/1988 | Konopik et al. . | |
| 5,218,703 | 6/1993 | Fleck et al. | 395/737 |
| 5,274,825 | 12/1993 | Lemay et al. | 395/737 |
| 5,287,523 | 2/1994 | Allison et al. . | |
| 5,381,552 | 1/1995 | Dahlberg et al. . | |

FOREIGN PATENT DOCUMENTS

| | | |
|---|---|---|
| 0 306 042 | 9/1988 | European Pat. Off. . |

*Primary Examiner*—Ayaz R. Sheikh
*Assistant Examiner*—Rupal D. Dharia

[57] ABSTRACT

The present invention is related to a data handling system comprising a central processing unit for executing a sequence of commands stored in a memory. This central processing unit comprises an interrupt request input and a priority input as well as means for servicing an interrupt request by executing a command sequence at a predefined address in said memory. The predefined address is an interrupt base address plus an offset address value defined by a priority number provided at the priority input. The system further comprises an interrupt request control unit comprising interrupt arbitration means and generating, after determining the interrupt request, the highest priority by said interrupt arbitration means, an interrupt request signal fed to said interrupt request input and providing a priority number at said priority input. A plurality of peripheral devices each having an associated interrupt service register for storing a priority number is coupled with the interrupt request control unit via an interrupt arbitration bus.

11 Claims, 4 Drawing Sheets

FIG_2

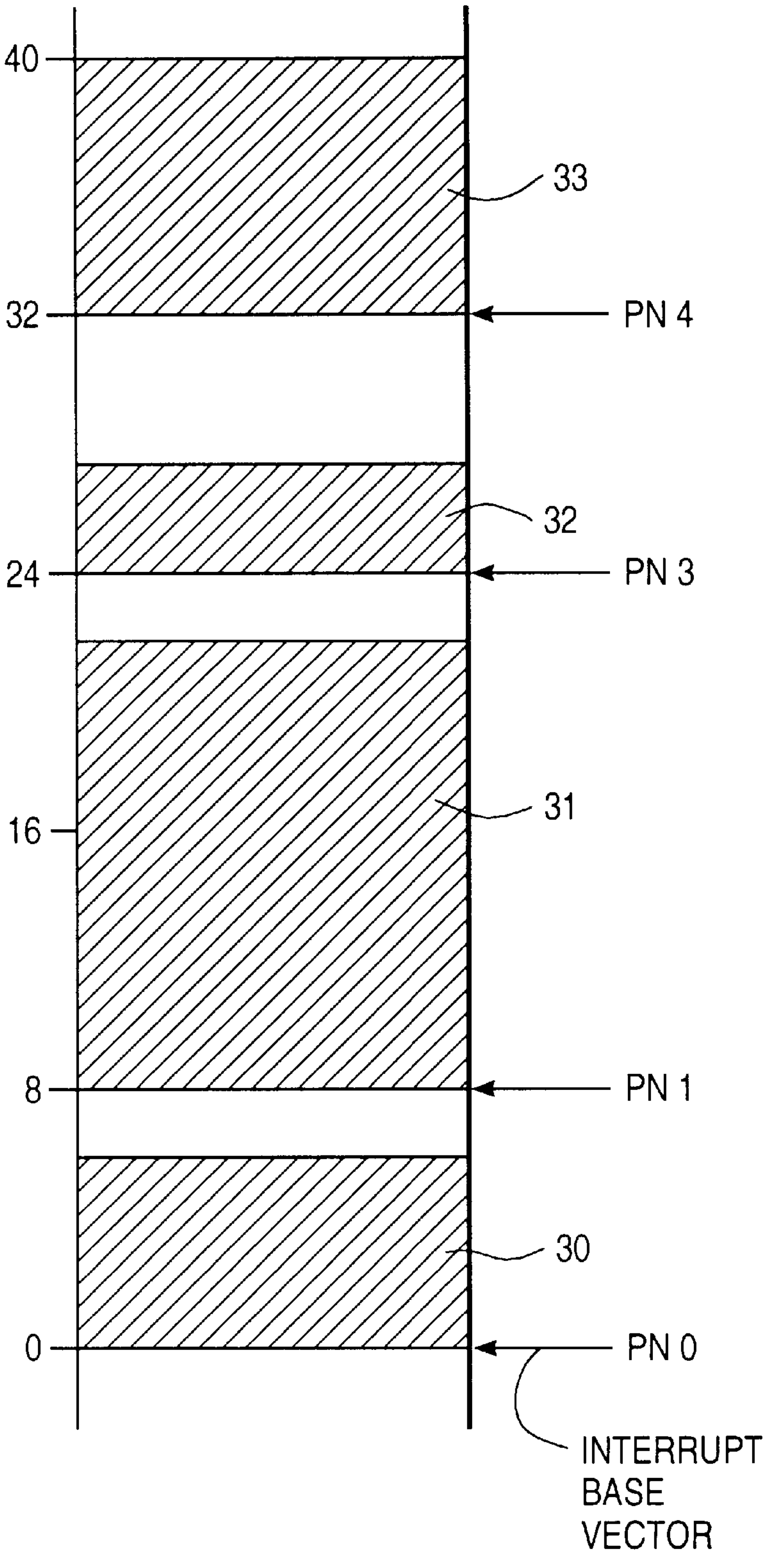
FIG_5

INTERRUPT SYSTEM WITH FAST RESPONSE TIME

BACKGROUND OF THE INVENTION

The present invention relates to a data handling system having an interrupt system, and to a method for servicing an interrupt request in a data handling system. Interrupt systems are well known in the art and established in a plurality of microcomputers and micro controllers. Most of the known systems are limited to a number of interrupt sources below ten. To service a higher number of peripherals generating interrupts, special interrupt controllers are provided. These interrupt controllers often provide an arbitration unit for selecting the source of an interrupt with the highest priority.

However, in a data processing system having a plurality of peripheral devices generating interrupt requests, it is often not possible to react on events in real time because handling of an interrupt request is too cumbersome and time-consuming.

SUMMARY OF THE INVENTION

Accordingly, it is an object of the invention to provide a data handling system having an interrupt system and a method for servicing an interrupt request in a data handling system with the possibility of reacting to an interrupt request very quickly and efficiently.

This object is achieved by a data handling system comprising a central processing unit for executing a sequence of commands stored in a memory. This central processing unit comprises an interrupt request input and a priority input as well as means for servicing an interrupt request by executing a command sequence at a predefined address in said memory. The predefined address is an interrupt base address plus an offset address value defined by a priority number provided at the priority input. The system further comprises an interrupt request control unit comprising interrupt arbitration means and generating, after determining the interrupt request, the highest priority by said interrupt arbitration means, an interrupt request signal fed to said interrupt request input and providing a priority number at said priority input. A plurality of peripheral devices each having an associated interrupt service register for storing a priority number is coupled with the interrupt request control unit via an interrupt arbitration bus.

The method for servicing an interrupt request in a data handling system having a central processing unit for executing a sequence of comments stored in a memory, an interrupt request control unit fed to the central processing unit and a plurality of peripheral devices each having an associated interrupt service register, whereby the peripheral device is coupled to the interrupt request control unit via an interrupt arbitration bus comprises the steps of:

a) assigning a priority number to each interrupt service register of said peripherals which need to be serviced according to a definable priority scheme;

b) evaluating an interrupt request with the highest priority by said interrupt request control unit;

c) comparing said priority of said interrupt request with a current priority of said central processing unit;

d) requesting an interrupt from the central processing unit by the interrupt request control unit if the priority of the interrupt request is higher than the priority of the central processing unit thereby providing the priority number to the central processing unit; and e) servicing the interrupt by executing a command sequence at a predefined address in said memory, whereby the predefined address is an interrupt base address plus an offset address value defined by the priority.

BRIEF DESCRIPTION OF THE DRAWINGS

FIG. 5 shows an example of a system using four peripheral devices which generate four different interrupt requests.

DESCRIPTION OF THE PREFERRED EMBODIMENT

Figure 1:
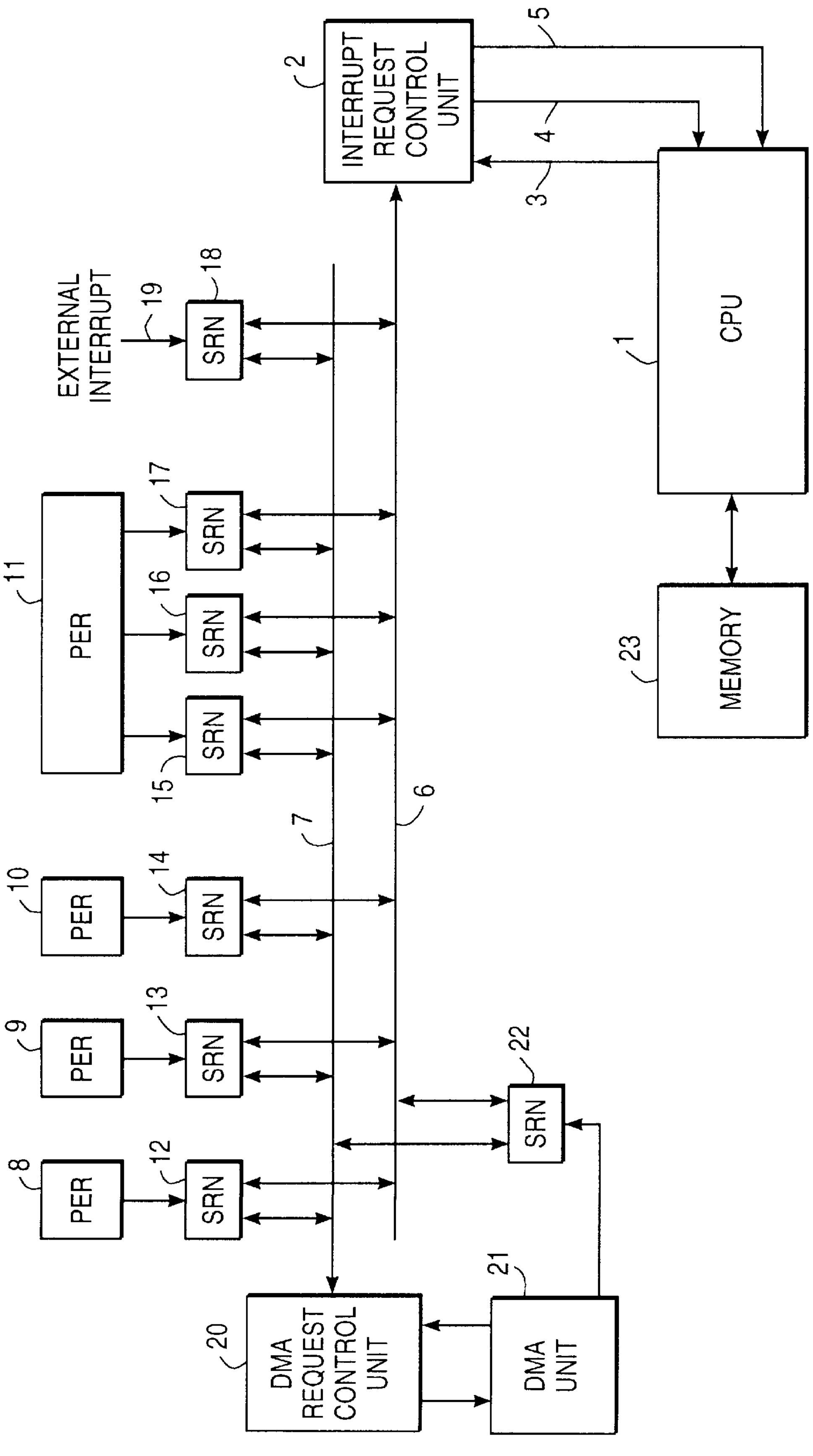
FIG. 1 shows a block diagram of the overall system including an interrupt system and a direct memory access system.

In FIG. 1, a central processing unit 1 is connected to a memory 23. An interrupt request control unit 2 is provided which generates an interrupt request which is fed into the central processing unit 1 via a line 5 and providing a priority number via line 4 to the central processing unit 1. The central processing unit acknowledges any interrupt request to the interrupt request control unit via line 3. An interrupt arbitration bus 6 has a plurality of lines, for example 8 lines to distinguish between 256 different interrupt sources. This bus 6 is connected to the interrupt request control unit 2. Furthermore, FIG. 1 shows a plurality of peripheral devices 8, 9, 10 and 11. Each peripheral device 8, 9, 10 and 11 is connected to at least one service request node 12, 13, 14, 15, 16 and 17. Peripherals 8, 9 and 10 each have one service request node 12, 13 and 14 associated with it. Peripheral 11 may generate, for example, three different interrupts, and therefore has three associated service request nodes 15, 16 and 17. An external interrupt request may be provided via line 19 which is connected to a further service request node 18. Each service request node 12–18 is coupled with interrupt arbitration bus 6.

In addition, a direct memory access system is provided. This system comprises a direct memory access arbitration bus 7 which is connected to a direct memory access request control unit 20. This direct memory access request control unit 20 is coupled to a direct memory access unit 21. A service request node 22 is associated and coupled to direct memory access unit 21. This service request node 22 is also connected to the interrupt arbitration unit 6. Every service request node 12–18 and 22 is additionally coupled to the direct memory access arbitration bus 7.

Figure 2:
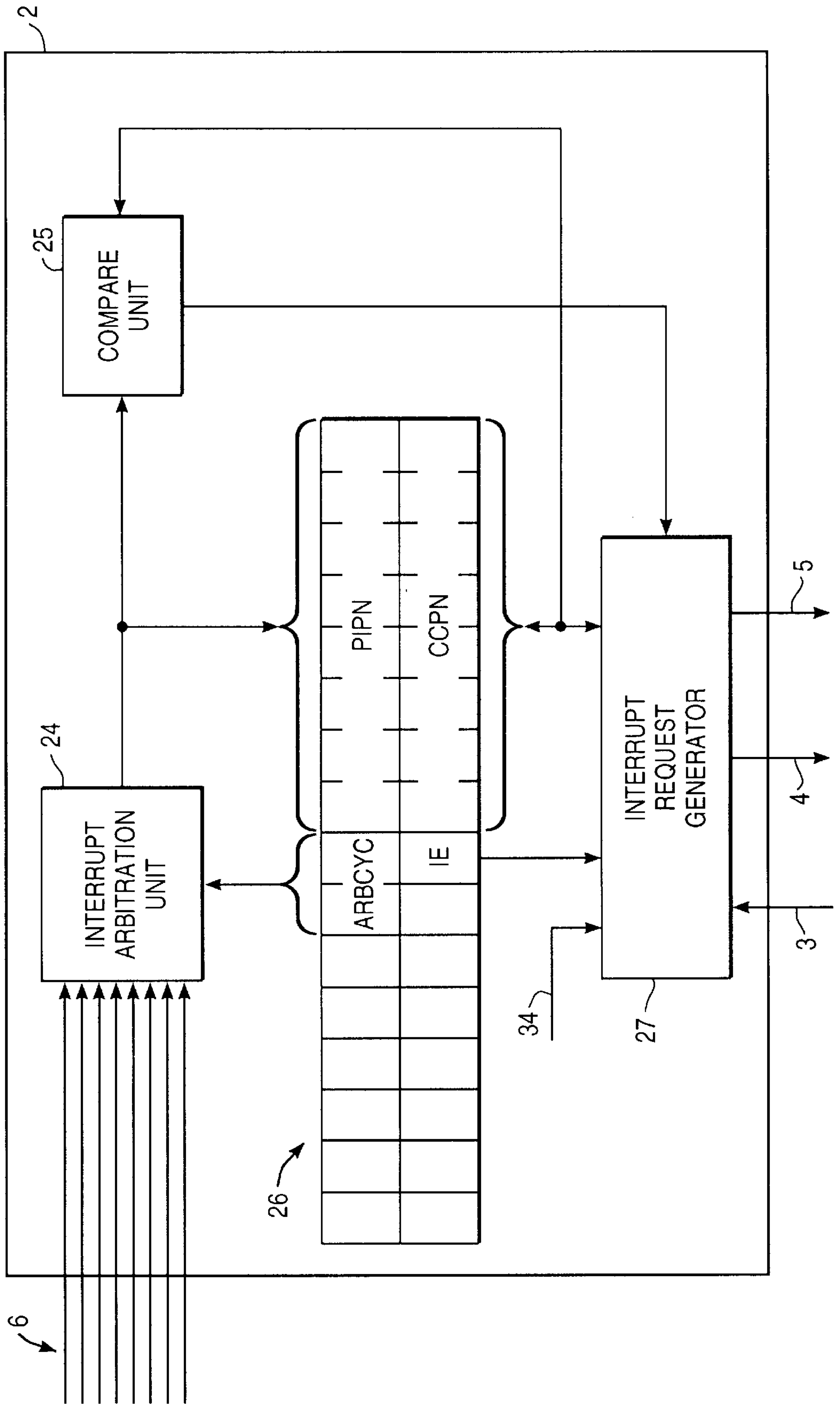
FIG. 2 shows the interrupt request control unit of FIG. 1 in more detail.

FIG. 2 shows the interrupt request control unit 2 in more detail. The interrupt arbitration bus 6 is connected to an interrupt arbitration unit 24. The interrupt arbitration unit 24 generates an output signal comprising the priority number of the winning service request node. This signal is fed to a compare unit 25 and to a respective part of a register 26. Register 26 comprises, for example, 32 bits whereby, in FIG. 2, the upper half shows bits 16–31 and the lower half shows bits 0–15. This interrupt control register 26 contains, for example, in bits 0–7, the current central processing unit priority number CCPN in bit 8, a global interrupt enable/disable bit, in bits 16–23, the pending interrupt priority number, and in bits 24 and 25, the number of arbitration cycles. Register 26 is connected to the compare unit 25 providing the current central processing unit priority number CCPN. Furthermore, an interrupt request generator 27 is provided which is connected to register 26. Register 26 provides the interrupt request generator 27 with information whether the interrupt system is globally enabled or disabled, via bit 8 of register 26. The interrupt request generator 27 provides register 26 with information about the current central processing unit priority number. Compare unit 25 generates an output signal indicating whether an interrupt should be generated and with the respective priority number. Interrupt request generator 27 is connected to lines 3, 4 and 5, according to FIG. 1.

Every service request line from a peripheral device 8–11 or an external input is connected to a respective service request node 12–18. In order to allow each service request source to request either a standard interrupt service from the central processing unit 1 or to request a direct memory request service, each service request node 12–18 is connected to both the interrupt arbitration bus 6 and the direct memory access arbitration bus 7. Each service request node 12–18 contains control and status bits to enable/disable the interrupt or direct memory access request and to program the priority number of the request.

Figure 4:
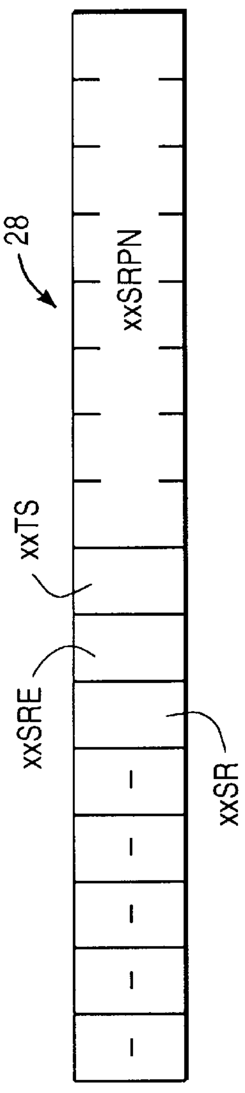
FIG. 4 shows a register associated with each peripheral device.

FIG. 4 shows control register 28. This register will be explained in more detail below. The interrupt request control unit 2 controls the operation of the interrupt arbitration bus 6 according to the current state of the central processing unit 1, while the direct memory access request control unit 20 does a similar control for the direct memory access arbitration bus 7.

The purpose of the service request nodes 12–18 and 22 is to provide means for controlling the service requests and to provide the proper connections to the interrupt and direct memory access arbitration buses 6 and 7. All of the service request nodes 12–18 and 22 for peripheral and external interrupts are identical. Details of an example of an embodiment of a service request node and its connection to an interrupt arbitration unit are described in U.S. Pat. No. 5,218,703 which is hereby incorporated.

FIG. 4 shows a service request control register for a requesting source xx (as an example, for a peripheral timer T3, this register will be called T3SRC and all of the control bits described in the following will have "xx" replaced by "T3"). Each service request node 12–18 and 22 has such a control register 24. The 8 bit field xxSRPN determines the interrupt or direct memory access priority number. Depending on whether a standard interrupt or a direct memory access service is requested, the range of the xxSRPN can be different. The bit xxTS ("type of service") controls whether a standard interrupt or a direct memory access service will be requested when the associated event in the peripheral or at the external pin occurs. Control bit xxSRE enables or disables the service request, while bit xxSR is the actual request bit which can be set by hardware or by software. The content of bit xxSR is set regardless of the state of the bit xxSRE. This is required in order to allow polling of request flags. The xxSR flag can also be set by software. This has the same effect as if this bit was set by hardware.

When a service request source is programmed for standard interrupt service through the central processing unit 1, the service request priority number of a request determines its priority in relation to the other sources requesting central processing unit service and to the priority of the central processing unit itself. Each service request priority number used in a system must be unique, no two or more sources are allowed to use the same service request priority number. The range for the service request priority number is dependent on the number of interrupt sources actually used in a system. The interrupt arbitration scheme allows at maximum of 255 sources to be active at any one time. This does not limit the number of sources which can be implemented. With more lines in the interrupt arbitration bus 6, more than 255 service requests can be implemented.

Figure 3:
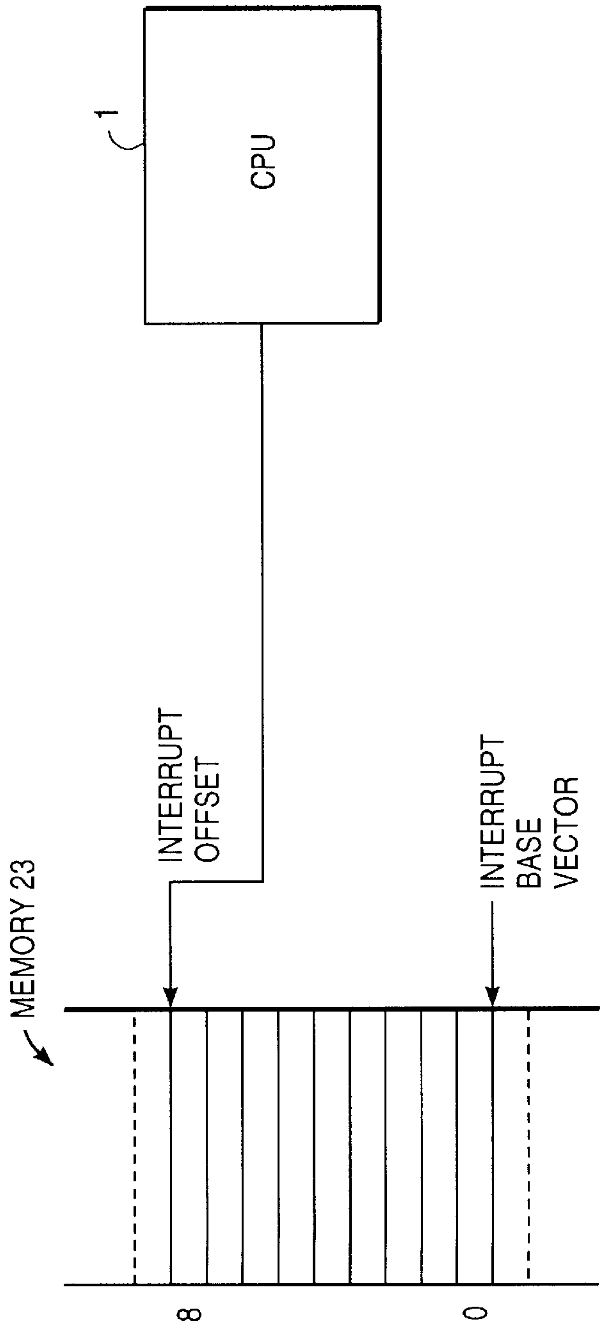
FIG. 3 shows the mapping of the interrupts to the memory

The second purpose of the service request priority number is to identify the entry into the interrupt vector table. Unlike normally used for microprocessors and micro controllers, where the vector table provides a specific entry for each specific interrupt source, according to the present invention, the vector table provides an entry for each priority number. This is shown in FIG. 3. In FIG. 3, an interrupt with a priority number is serviced which generates an offset of 8 bytes. Therefore, the program flow is interrupted and execution jumps to a location in memory 23 determined by an interrupt base vector plus an interrupt offset. In this example, the interrupt entry address is the interrupt base vector plus 8 bytes.

When a service request node 12–18 and 22 is programmed to be serviced via the direct memory access unit 21, the service request priority number determines the priority of the direct memory access request in relation to other sources requesting the direct memory access service. Again, each service request priority number used for requesting direct memory access service must be unique. However, the same service request priority numbers used for interrupt priorities can be used to define a direct memory access request priorities and vice versa.

The interrupt control unit 2 manages the interrupt system and performs all of the actions necessary to arbitrate incoming interrupt requests, to find the one with the highest priority and to determine whether to interrupt the central processing unit 1 or not. An embodiment of such an arbitration procedure is, for example, described in U.S. Pat. No. 5,274,825, as mentioned above. The interrupt control unit 2 contains an interrupt control register 26, which holds the current central processing unit priority number CCPN, the global interrupt enable/disable bit, i.e., the pending interrupt priority number PIPN, as well as two bits to control the required numbers of interrupt arbitration cycles. The number of arbitration cycles control field (ARBZYZ) controls the number of arbitration cycles used to determine the request of the highest priority. To prevent malfunction, this field may only be modified during its initialization period, and then will be locked against modifications. Four different arbitration cycles may be determined whereby the number of arbitration cycles determines the maximum number of active interrupt sources. For example, a number of arbitration cycles of 4 allows a maximum number of active interrupt sources of 256, whereby a number of arbitration cycles of 2 limits the number of active interrupt sources to 16.

When an interrupt or direct memory access service is requested by one or more peripheral devices 8–11 or an external device, the request will be serviced depending on their priority ranking. Thus, each time the request with the highest priority must be determined. For this, an arbitration scheme will be implemented that allows the arbitration to be performed in parallel to normal central processing unit operation. All sources requesting service will compete among themselves on a specific interrupt arbitration bus 6 until the source with the currently highest priority number is found. This procedure is controlled by the interrupt control unit and takes place in several arbitration cycles. The number of cycles is dependent on the implementation and user programming. One line of the arbitration bus is used as a wake up line from all service request nodes to the interrupt control unit. When a service request is generated through setting of the service request bit xxSR, this line is activated. In response, the interrupt control unit will start an arbitration round. At the end of the arbitration round, one service request node will be the winner of this round, and the interrupt control unit 2 has detected the priority number of this request. This number is stored in the field PIPN of register 26 to indicate the pending interrupt priority number. Queuing the arbitration in a central processing unit itself will also take part in the arbitration round such that the compare unit 25 monitors the arbitration bus and checks the central processing unit current priority number CCPN in register 26 against the service request priorities. The central processing unit 1 can only be interrupted if the priority number of the request is higher than the current central processing unit priority number. If the pending interrupt priority number PIPN is higher than the current central processing unit priority number CCPN and the central processing unit 1 is able to perform entry into the service routine, the interrupt control unit 10 activates and acknowledge cycle over the arbitration bus to inform the winner node that it will be serviced. This node will then reset its service request flag. There are several conditions which could block the central processing unit 1 from immediately responding to the interrupt request, even if the priority of the request is higher than the current central processing unit priority number CCPN. For example, the interrupt system could be globally disabled, the central processing unit could execute a multi cycle instruction, a trap could be detected and the central processing unit is entering a trap service routine, the central processing unit could execute a locked sequence, or the central processing unit could execute an instruction which modifies the conditions of the interrupt system, such as modifying the register 26. The central processing unit 1 will respond to the interrupt request if these conditions are no longer true. If the priority of the central processing unit 1 is higher or equal to the detected pending interrupt priority number, no immediate further actions are performed. The interrupt control unit 2 goes into an idle state until one of the following conditions is true.

A new arbitration round will only be started when a new service request is detected through the wake-up signal. In this case, the pending interrupt priority number will be first set to 0 to indicate it as invalid. If the current central processing unit priority number is changed due to explicit software modification or through the return from an interrupt, the pending interrupt will be serviced if the new current central processing unit priority number is now lower than the pending interrupt priority number. Otherwise, no actions are performed and the service request is left pending. If all conditions are clear for the central processing unit to service an interrupt request, the interrupt system is globally disabled and entry into the service routine is performed. The new current central processing unit priority number in register 26 will now be the pending interrupt priority number. This will block interrupts of equal or lower priority than the currently serviced interrupt when the interrupt system is enabled again. However, the interrupt service routine can set the current central processing unit priority number CCPN to any value before enabling interrupts, thereby blocking an entire group of interrupts that includes the current interrupt. This has the effect of implementing a set of priority levels on top of the individual priority numbers in the service request nodes.

Enabling the interrupt system again and setting a new current central processing unit priority number CCPN can be performed in one instruction, for example, a special instruction which modifies the content of register 26. In addition, this instruction also saves the lower context.

According to the present invention, this interrupt system can perform a service request regardless of whether the interrupt system is globally enabled or not, or whether there are other conditions preventing the central processing unit 1 from servicing interrupts. In this way, the pending interrupt priority number field PIPN in the register 26 always reflects the pending service request with the highest priority. This scheme also has the advantage of reducing the power consumption since arbitrations are not performed continuously but only when really required.

Having the pending interrupt priority number PIPN as an indication on a pending interrupt request also allows an immediate reaction on return from an interrupt if the priority of the pending request is higher than the one of the task which is returned to. In traditional machines, after execution of an interrupt routine, the machine returns to the interrupted task and then performs a branch to the next interrupt service routine. This can, besides the time penalty, involve some unnecessary actions, such as first restoring the context of the interrupt task, then saving it again in order to service the next interrupt period. The architecture, according to the present invention allows to immediately check whether a further interrupt priority number which occurs during a service routine and which priority is lower than that of the service routine is higher than the current central processing unit priority number of the interrupted task. It directly performs a branch to the new interrupt service routine if this is the case without returning to the interrupted task. This so-called interrupt folding saves time and power consumption by avoiding the unnecessary context restore and save operations.

As mentioned before, the arbitration scheme implemented for the interrupt arbitration can handle a different number of active interrupt sources depending upon the number of cycles. With two arbitration cycles, a maximum number of active interrupt sources is 16, with three arbitration cycles, there are 64 interrupt sources and with four arbitration cycles, there are 256 interrupt sources available. In order to minimize the interrupt response time, the number of arbitration cycles should be adapted to the number of interrupts implemented and used in a data handling system. There are two ways to perform this adaptation. The maximum number of cycles can be fixed by hardware according to the total number of interrupt sources implemented in a data handling system. The user can program the required number of arbitration cycles according to the number of interrupts actually used in an application. For example, a specific data handling system contains 40 service request sources. Hardware has to provide at least three arbitration cycles to allow all sources to be used in an application. However, if a user actually uses only 12 sources and all other sources are either totally not used or checked through polling, a 2-cycle arbitration is sufficient to perform the priority ranking. From the procedure of the arbitration, it is clear that if a new interrupt request is set while an arbitration of previously generated interrupt requests is in progress, this new interrupt must not take part in the current arbitration. It can only take part if the interrupt request was raised before an arbitration round starts. Therefore, interrupt requests generated while an arbitration round is in progress must be disabled until the current arbitration round is finished. The interrupt request flag, however, must be set as soon as the request is generated. The vector table in the data handling system according to the present invention is organized according to the priority number of the interrupts. Therefore, no identification has to be sent from the winning interrupt to the central processing unit 1. Instead, the priority of the winner, determined automatically at the end of an arbitration round, identifies the entry into the vector table. This reduces the interrupt latency since the extra cycle of the transfer of the identifier can be omitted. Another advantage occurs because the size of the vector table is only dependent on the number of interrupts actually used in a system. The vector table always occupies a number of consecutive memory locations; there are no gaps in between the individual entries. This reduces the memory portion required for the vector table.

Every priority number is assigned to a specific memory location. This memory location starts with a programmable interrupt base vector address. For example, the lowest priority 0 starts at this interrupt base vector address. The following priority numbers are assigned to consecutive memory addresses, whereby each offset between two consecutive priority numbers is defined by an address range. According to FIG. 3, this address range is 8 bytes long. The interrupt request control unit 2 either provides the central processing unit 1 with a respective priority number and the central processing unit then calculates the resulting interrupt vector address, or the interrupt request control unit 2 provides the central processing unit 1 via lines 4 with a respective interrupt vector address. In this example, when the central processing unit 1 has accepted an interrupt request, the priority number of this interrupt determined at the end of the arbitration is taken as an offset pointer into the interrupt vector table. The value is shifted left by 5 bits and ORed with address of the base of interrupt vector register. The left shift gives a spacing of 8 words, whereby each word is 32 bits long, between the individual vector locations. This is enough space to store the initial instructions of a service routine. Usually, a jump is then performed to the continuation address of the interrupt service routine. However, since the vector entries are determined by the priority number and are not tied to any specific peripheral or external input, it is also possible to stretch a service routine over several vector locations. Special care has to be taken, however, to not program a service request node to a priority number which has its assigned vector entry inside of such a service routine. Therefore, service routines can be written very efficiently allowing the fastest possible execution time of the respective routine without jumping or branching to different memory locations.

On the other hand, because the priority numbers are not fixedly assigned to respective peripherals but rather programmable to each peripheral device, the memory used for the respective interrupt routines can be used very economically. In other words, the user may program a system with a number of different priority numbers such that every routine is stored consecutively to the following routine in the memory without any or only minimal unused memory. FIG. 5 shows an example of a system using four peripheral devices which generate four different interrupt requests. These four peripheral devices will be programmed so that the first peripheral device is assigned to priority number 0, the second one is assigned to priority number 1, and the third is assigned to priority number 3 and the fourth to priority number 4. As can be seen in FIG. 5, the routine sorting interrupt request from the first peripheral device starts at the interrupt base vector address. The routine is depicted with numeral 30 and requires, for example, six words. The routine serving the second peripheral device starts at an offset address of 8 words and is depicted by numeral 31. In this example, this routine has a length of, for example, 14 words, which requires that priority number 2 is not assigned to any peripheral device. Therefore, the routine serving the third peripheral device starts at offset address 24 and has a length of three words depicted by numeral 32. The last routine serving interrupt requests of the fourth peripheral device starts at offset address 32 and is depicted by numeral 33. This routine, for example, has a length of 8 words.

According to the present invention, memory space can be assigned very efficiently and economically thereby providing the possibility to write service routines which can be executed very fast.

The interrupt system according to the present invention will allow a fully flexible priority leveling scheme. Only the absolute number of, for example, 255 active interrupt sources puts a limitation onto the number of priority levels and the number of interrupt sources grouped onto one priority level. This flexible priority scheme is achieved by using the central processing unit interrupt priority number CCPN. Each time an interrupt is serviced by the central processing unit, the priority number CRPN of that interrupt is stored in the register 26 as the new current central processing unit priority number. Entry in the service routine is always performed with interrupts disabled, thus the user can reprogram the CCPN field in register 26 with a special instruction to any new value without worrying about being interrupted for that operation.

For grouping several interrupt sources onto one priority level, one simply sets the current central processing unit priority number CCPN in each of the interrupt service routines to the same value, which is the priority number of the interrupt with the highest service request priority number SRPN in that priority group. Each time the central processing unit 1 services one of the interrupts in a priority group, its CCPN field is set to the highest priority number of that group and then interrupts can be enabled again. No other interrupt request of that group can now interrupt this service, so no one has a higher priority. One can easily see the flexibility of this scheme. There are no limitations in the number of interrupt sources grouped onto the same priority level, and there are no limitations on the number of priority levels. Programmable options range from one priority level with 255 sources up to 255 levels with only one source each. This scheme also provides the following options: interrupt service routines can easily be divided into parts with different priorities. One case is, that an interrupt is placed on a very high priority because response time and reaction to a new end is very critical. The immediate necessary actions are carried out on that high priority level. Then, the priority level of this interrupt is lowered and the interrupt request bit is set again while still in the service routine. Then, the service routine is terminated by returning to the interrupted program. The pending interrupt will now wait for service until the central processing unit priority is lower than its own. After entering the service routine, which can now be at a different address in the program memory, the outstanding but low priority actions of the interrupt can be performed. This scheme even allows special interrupt handling. There might be cases where interrupts are placed onto a relatively low priority level because the response time to an event is not very critical. But, if they have been granted service, this service should run on a very high, or even the highest priority level, to prevent interruption. This procedure can easily be performed with the priority leveling scheme of the data handling system according to the present invention.

I claim:

1. Method for servicing a service request in a data handling system having a central processing unit for executing a sequence of commands stored in a memory, a service request control unit connected to said central processing unit and a plurality of peripheral devices each having an associated service register, said peripheral device being coupled to said service request control unit via a service arbitration bus comprising the steps of:

a) assigning a priority number to each service register of said peripherals which need to be serviced according to a definable priority scheme;

b) evaluating a service request with the highest priority by said service request control unit;

c) comparing said priority of said service request with a current priority of said central processing unit;

d) requesting a service from said central processing unit by said service request control unit if said priority of said service request is higher than said priority of said central processing unit thereby providing said priority number from said service request control unit directly to said central processing unit;

e) executing a command sequence at a predefined address in said memory, said predefined address being a service base address plus an offset address value defined by said priority. wherein two consecutive priority numbers define an address range containing a plurality of bytes, said offset address being said address range multiplied by said priority number.

2. Method according to claim 1, wherein said service request control unit comprises a register storing said priority of said central processing unit, said method further comprises grouping of said peripheral devices into groups of different priority levels by programming said register during service of a service request to the highest priority number of the respective group.

3. Method according to claim 1, wherein a respective number of consecutive priority numbers is not assigned to any active peripheral device to reserve a specific address range consisting of consecutive bytes in said memory which is long enough to store a service routine longer than said offset address range.

4. Method according to claim 1, further comprising the steps of: while executing said command sequence evaluating further service requests.

5. Method according to claim 4, further comprising the steps of: after execution of said command sequence comparing a pending service request priority with said previous current priority and servicing said pending service request if the associated priority is higher than said previous current priority.

6. Data handling system comprising:

a central processing unit for executing a sequence of commands stored in a memory, said central processing unit comprising a service request input including a priority input and means for servicing a service request by executing a command sequence at a predefined address in said memory, said predefined address being a service base address plus an offset address value defined by a priority number provided at said priority input;

a service request control unit comprising service arbitration means and generating, after determining the service request with the highest priority by said service arbitration means, a service request signal fed to said service request input and providing a priority number from said service request control unit directly to said priority input;

a plurality of peripheral devices each having an associated service register for storing a priority number;

a service arbitration bus, coupling said peripheral devices with said service request control unit.

7. Data handling unit according to claim 6, wherein said service request control unit comprises a register storing a current priority number of said central processing unit and comparing means to compare said priority number of said central processing unit with the priority number of said service request.

8. Data handling unit according to claim 7, further comprising means to rewrite said register storing said current priority number of said central processing unit, said means upon executing a rewrite command disable any service request control unit from issuing a service request.

9. Data handling unit according to claim 6, wherein said service request unit operates independently from said central processing unit, thereby a further service request priority is evaluated while said central processing unit executes a service routine.

10. Data handling unit according to claim 9, further comprising comparing means for comparing a further service request priority with a priority before execution of said service routine and if said priority is higher generating a signal for execution of a further service routine which will be executed directly after execution of said service routine.

11. Data handling unit according to claim 6, wherein said central processing unit is a direct memory access controller.

* * * * *